United States Patent [19]

Sapitowicz

[11] Patent Number: 4,695,171
[45] Date of Patent: Sep. 22, 1987

[54] HORIZONTALLY OR VERTICALLY ORIENTABLE COMPACT TICKET PROCESSOR

[75] Inventor: Thomas P. Sapitowicz, Bel Air, Md.

[73] Assignee: General Instrument Corp., New York, N.Y.

[21] Appl. No.: 804,523

[22] Filed: Dec. 4, 1985

[51] Int. Cl.⁴ .................... B41J 3/516; B41J 13/00
[52] U.S. Cl. .................................. 400/70; 101/66;
  101/235; 400/73; 400/578; 271/116; 109/10
[58] Field of Search ............... 101/66, 69, 233–235;
  271/186, 902, 266, 116; 109/2, 10, 24.1; 400/82,
  103, 105, 73, 578

[56] References Cited

U.S. PATENT DOCUMENTS

| | | | |
|---|---|---|---|
| 2,763,446 | 9/1956 | Hansen | 109/10 |
| 3,550,930 | 12/1970 | Brown | 101/235 |
| 3,718,244 | 2/1973 | Bukowski et al. | 400/73 |
| 3,936,041 | 2/1976 | Shuna et al. | 271/116 |
| 3,998,451 | 12/1976 | McInerny | 101/235 |
| 4,032,135 | 6/1977 | Rüenzi | 271/116 |
| 4,040,325 | 8/1977 | Adams et al. | 101/66 |
| 4,349,283 | 9/1982 | Meloni et al. | 400/124 |
| 4,534,287 | 8/1985 | Meloni | 400/124 |
| 4,585,125 | 4/1986 | Mori et al. | 271/902 |

FOREIGN PATENT DOCUMENTS

| | | | |
|---|---|---|---|
| 147730 | 7/1985 | European Pat. Off. | 82/ |
| 54576 | 3/1984 | Japan | 400/82 |

*Primary Examiner*—William Pieprz
*Attorney, Agent, or Firm*—James & Franklin

[57] ABSTRACT

The processor has a "U"-shaped transport path with input and output slots in closely situated parallel planes. An overrunning clutch forms part of the transport drive between the reader and the printer to shorten the transport path by permitting the leading edge of the ticket to enter the printer while the ticket is being read by the higher speed reader. The processor can be either horizontally or vertically oriented. When vertically oriented, the input and output slots can be situated on opposite sides of a glass partition to permit customer insertion of a pre-marked ticket.

10 Claims, 10 Drawing Figures

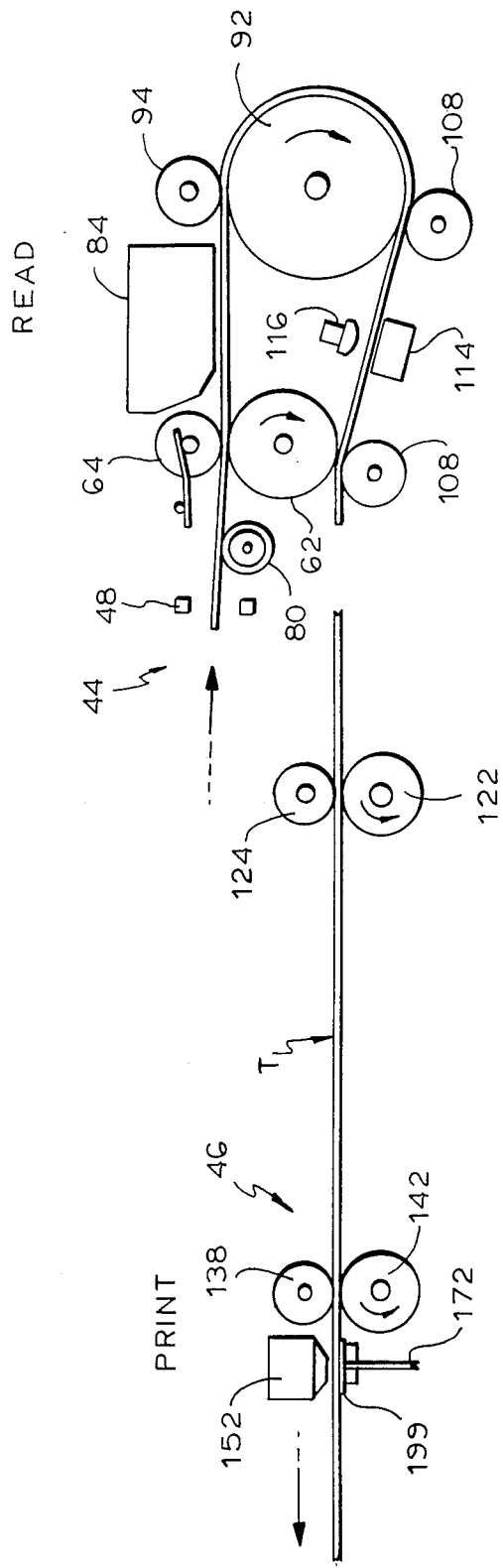

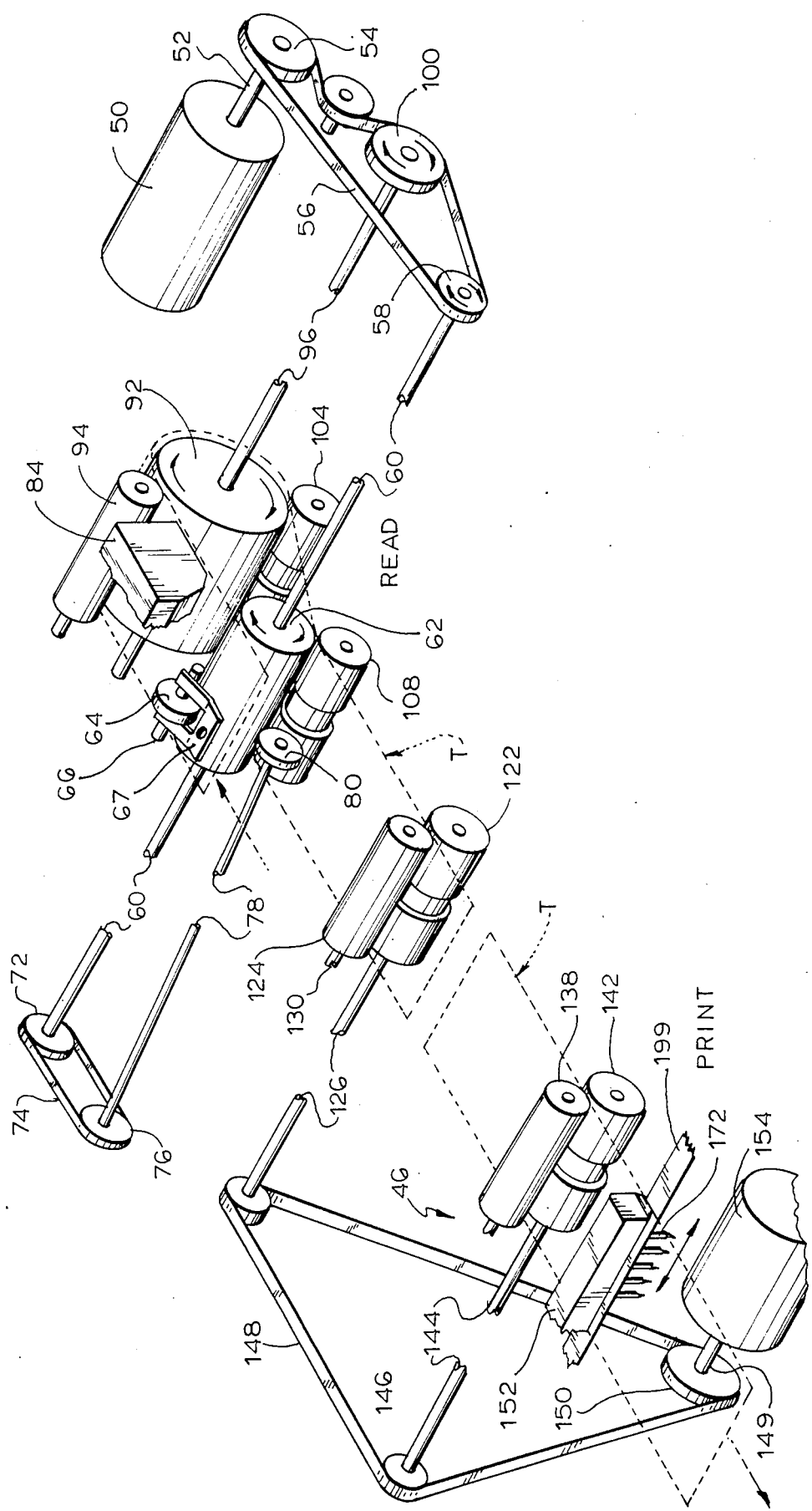

HORIZONTALLY OR VERTICALLY ORIENTABLE COMPACT TICKET PROCESSOR

The present invention relates to devices for processing customer marked tickets of the type used for lotteries, parimutuel betting, and various types of entertainment or sports events and, more particularly, to a highly compact ticket processor which, with slight modifications, can be used either in a horizontal or a vertical orientation, so as to accept premarked tickets from an agent or directly from the customer, respectively.

Many states now permit certain types of gambling such as lotteries and numbers games to raise revenue. Because of the nature of these gambling operations, tickets are normally sold at a multitude of different locations throughout the state, such as in stores, at news stands, in railroad stations, on street corners, and the like. The widespread availability of such lottery tickets and the simplicity of placing a bet have significantly enhanced the popularity of such games. As a consequence, the lottery and numbers games have become competitive with other forms of gambling, such as off-track betting operations, although they lack the sports aspect associated with racing.

Normally, one purchasing a lottery ticket would go to a designated location where a lottery agent is present. The customer would orally advise the agent of the relevant transaction data and pay the agent the necessary fee. The agent would have a ticket issuing machine with a keyboard input into which the agent would punch the transaction data. The ticket issuing device would print the ticket with the transactional data and transmit the data to a memory bank for processing. The machine would then eject the ticket which would be given by the agent to the customer as her/his receipt.

In order to expedite the ticket purchasing and processing operation, ticket processors have been developed for use with tickets which can be pre-marked by the customer to indicate the transaction data representative of the wager. The pre-marked ticket is then handed to an agent, along with the money being wagered. The agent inserts the pre-marked ticket into the processor which reads the pre-marked data, prints the ticket, and transmits the data to a central processing unit which processes and records the bet. In some instances, it is preferable to permit the customer to insert the pre-marked tickets directly into the ticket processor and then hand the money to the agent.

The present invention relates to a ticket processor which, with slight modifications, can be used for either of these modes of operation. It is a highly compact device which can be utilized either in a horizontal or vertical orientation. When oriented vertically, it can be used in conjunction with a vertical glass partition with the input slot on the customer side of the partition and the output slot on the agent side. This orientation permits the device to be used in the second mode of operation where the customer inserts the pre-marked ticket into the input slot directly.

Because the processor of the present invention is highly compact, it is suitable for use in supermarket check-out lines, newsstands, and other areas where low ticket volume or limited space previously prohibited existing terminals. Moreover, the processor can be manufactured at relatively low cost because of its simplicity and because it utilizes a commercially available reader assembly and a standard shuttle-type printer.

The compactness of the device is the result of a unique "U"-shaped transport path which permits the input slot and the output slot to be relatively closely situated in substantially parallel planes.

In addition, the transport path is reduced in length through the use of a ticket speed compensating mechanism which permits the leading edge of the ticket to be accepted into the slower speed printer while the body thereof is still within the reading mechanism. This is accomplished through the use of a drive roller, driven by the printer transport motor through an overrunning clutch to permit the relatively fast moving ticket to be received in the printer.

Compactness is also achieved by the elimination of a verification mechanism often employed to verify that the ticket has been correctly printed. This is possible in the lottery situation because incorrectly printed losing tickets are of no consequence and incorrectly printed winning tickets are checked against the information in the central processing unit memory bank upon cashing.

It is, therefore, a prime object of the present invention to provide a highly compact ticket processor which can be used in either horizontal or vertical orientations.

It is another object of the present invention to provide a horizontally or vertically orientable compact ticket processor utilizing a substantially "U"-shaped transport path.

It is another object of the present invention to provide a horizontally or vertically orientable compact ticket processor wherein the input slot and the output slot are relatively closely situated in substantially parallel planes.

It is another object of the present invention to provide a horizontally or vertically orientable compact ticket processor with a transport path of reduced length.

It is another object of the present invention to provide a horizontally or vertically orientable compact ticket processor wherein a ticket speed compensating mechanism forms a portion of the transport path between the reader and the printer.

It is another object of the present invention to provide a horizontally or vertically orientable compact ticket processor wherein the overrunning clutch mechanism permits the leading edge of the ticket to be accepted into the relatively slowly operating printer mechanism while the body of the ticket is still within the reader.

In accordanace with one aspect of the present invention, a ticket processor is provided for use with a customer markable ticket. The processor comprises a housing, a ticket input slot, ticket reading means, ticket printing means, a ticket output slot, and means for transporting a ticket through a substantially "U"-shaped path. The path comprises three sections. The first section extends from the input slot through the reading means. The third section extends through the printing means to the output slot. The second section connects the first and second sections. The first and third sections are in relatively closely situated substantially parallel planes.

The second section comprises an arcuate transport path. The arcuate transport path comprises a substantially semi-circular channel. The semi-circular channel has a diameter which exceeds the distance between the parallel planes.

The processor can be used with a substantially planar partition adjacent the housing, such as the glass partition of a ticket booth. The partition is situated with the input slot on one side thereof and the output slot on the other side thereof. In this case, the partition is situated in a plane substantially parallel to and between the parallel planes of the input and output slots. This permits a customer to insert the premarked ticket directly into the processor.

Preferably, the partition is substantially vertically oriented. Accordingly, the planes of the input slot and output slot are also substantially vertically oriented.

In accordance with another aspect of the present invention, a ticket processor is provided for use with customer-markable tickets. The processor comprises ticket reading means operable at a first speed, ticket printing means operable at a second, relatively slower, speed, and means for transporting a ticket from the reading means to the printing means. The transporting means comprises means for accepting a ticket from the reading means at the first speed and for driving the ticket through the printing means at the second, relatively slower, speed.

The printer comprises a drive motor having an output shaft. The transporting means comprises a drive roller and a pressure roller. The drive roller comprises an input shaft. Overrunning clutch means operably mechanically connect the input shaft and the drive roller. Means are provided for operably mechanically connecting the motor output shaft to the drive roller input shaft.

Ticket sensing means are provided. Means are provided for actuating the printing means when the sensing means senses the leading edge of a ticket.

The processor further comprises a ticket input slot, a ticket output slot, and a ticket transport path. The transport path comprises a first section from the input slot through the reading means. A third section extends through the printing means to the output slot. A second section interconnects the first and third sections. The first and third sections are relatively closely situated in substantially parallel planes.

The second section comprises an arcuate path. The arcuate path preferably comprises a substantially semicircular channel having a diameter which exceeds the distance between the parallel planes.

The processor is designed for use with a substantially planar partition adjacent the processor housing. The partition is situated with the input slot on one side thereof and the output slot on the other side thereof. The partition is situated in a plane substantially parallel to and between the parallel planes. The partition is preferably substantially vertically oriented.

To these and to such other objects which may hereinafter appear, the present invention relates to a horizontally and vertically orientable compact ticket processor, as described in detail in the following specification and recited in the annexed claims, taken together with the accompanying drawings, wherein like numerals refer to like parts, and in which:

FIG. 9 is a schematic view illustrating the "U"-shaped ticket transport path of the horizontally or vertically orientable compact ticket processor of the present invention; and FIG. 10 is an isometric view of the internal components of the horizontally or vertically orientable compact ticket processor of the present invention illustrating the various drive interconnections.

Figure 1:
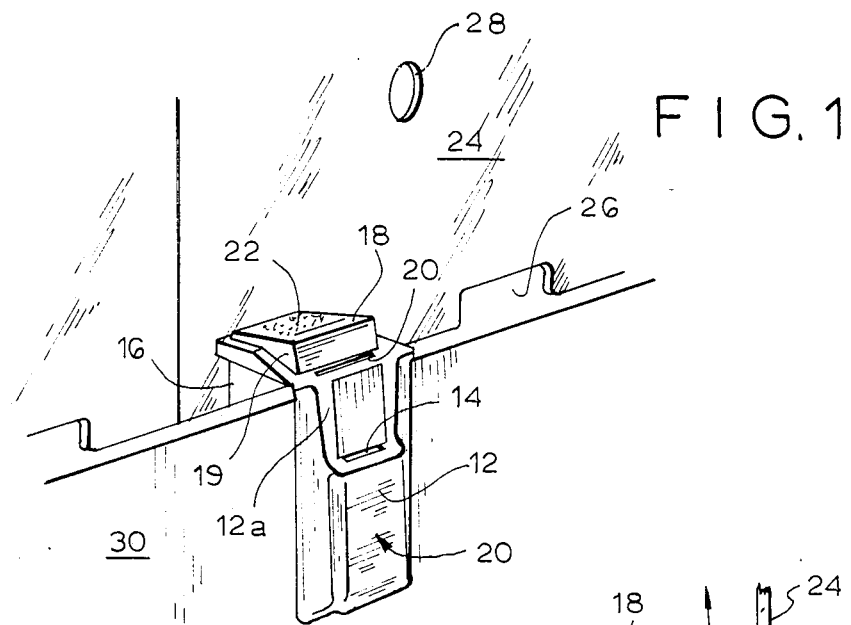
FIG. 1 is an isometric view of the horizontally and vertically orientable compact ticket processor of the present invention in the vertical orientation showing same from the customer side of a ticket booth.
Figure 2:
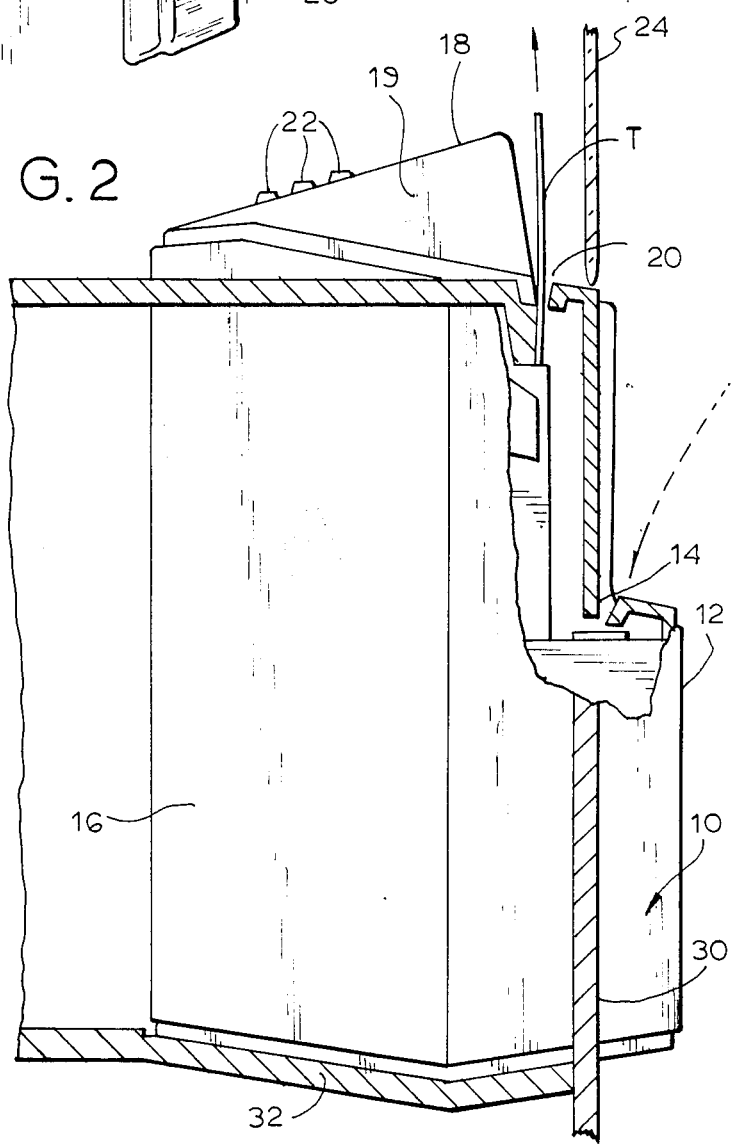
FIG. 2 is an isometric view of the horizontally and vertically orientable compact ticket processor showing same in the vertical orientation from the agent side of a ticket booth.
Figure 3:
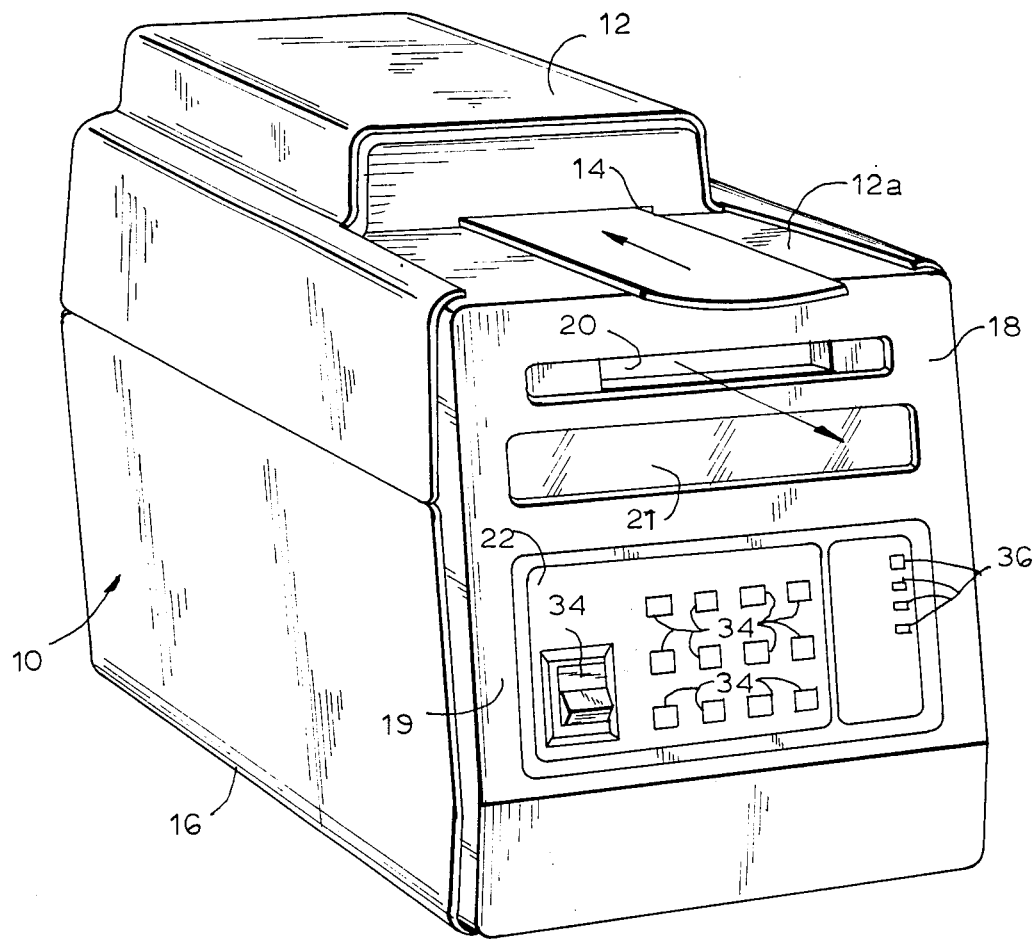
FIG. 3 is an isometric view showing the horizontally or vertically orientable compact ticket processor of the present invention in the horizontal mode.

As illustrated in FIGS. 1-3, the ticket processor of the present invention can be utilized in either a horizontal or a vertical orientation, depending upon whether the customer pre-marked ticket is to be inserted by the agent or directly by the customer. The only difference in structure between processors designed for use in these orientations is the direction of the inclination of the keyboard bezel on the side of the processor to make same more conveniently accessible by the agent. All other components of the processor remain the same, whether it is designed for horizontal or vertical use.

The processor includes a generally rectangular housing, generally designated 10, having an input surface 12 which, when the processor is vertically mounted on the front of an agent ticket booth, as illustrated in FIGS. 1 and 2, is accessible from the customer side of the booth to permit the customer to directly enter a pre-marked ticket into input slot 14. When horizontally oriented, as illustrated in FIG. 3, input surface 12 of housing 10 is situated at the top of the processor. The surface 16, opposite input surface 12, faces the ticket agent when the processor is vertically oriented and forms the bottom of the processor when horizontally oriented.

Housing 10 has an output surface 18 which includes an output slot 20, an LED readout portion 21, and a keyboard 22 which forms the top surface of the housing when vertically oriented and the end of the housing when horizontally oriented. Portion 21 and keyboard 22 are formed on a bezel 19 which can be installed in one of two different orientations. When used vertically, the bezel 19 is situated such that surface 18, which includes keyboard 22, is inclined downwardly away from output slot 20, as illustrated in FIGS. 1 and 2, to make same more easily accessible to the agent. When horizontally oriented, bezel 19 is situated such that the surface 18 which includes keyboard 22 is inclined towards output slot 20 such that the keyboard can be more easily manipulated by the agent.

Input slot 14 and output slot 20 are relatively closely situated in parallel planes. When vertically oriented, as shown in FIGS. 1 and 2, a glass partition 24 can be situated adjacent the housing in a substantially vertical plane, between the planes of the input slot 14 and output slot 20 so as to prevent the customer from having access to a ticket as it is ejected from the output slot 20. Partition 24 may be the conventional glass partition which is commonly used at ticket booths of this type. The partition 24 preferably has an opening 26 through which the customer hands the agent money for the wager and an opening 28, at head height, through which the customer and agent may communicate. When used in this mode, the lower wall 30 of the booth surrounds the housing 10, which rests on a vertical platform 32.

Figure 4:
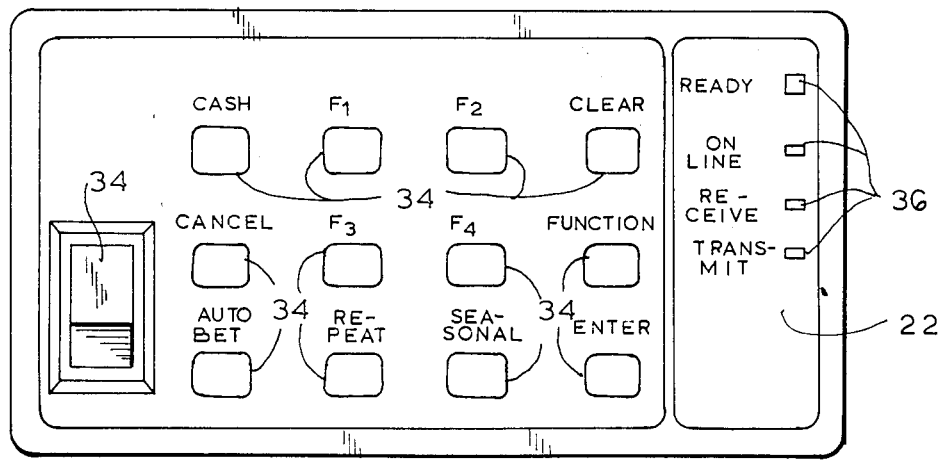
FIG. 4 is a plane view of the input keyboard of the present invention.

As seen in FIG. 4, keyboard 22 includes a number of pushbuttons 34 which permit the agent to control the various operations of the processor, including turning the processor on and off, entering various information, clearing the electronics, cancelling a ticket, etc. Also provided are a number of indicator lights 36 which advise the agent as to the operation of the processor. The keyboard and the functions thereof are conventional and form no part of the present invention.

Figure 5:
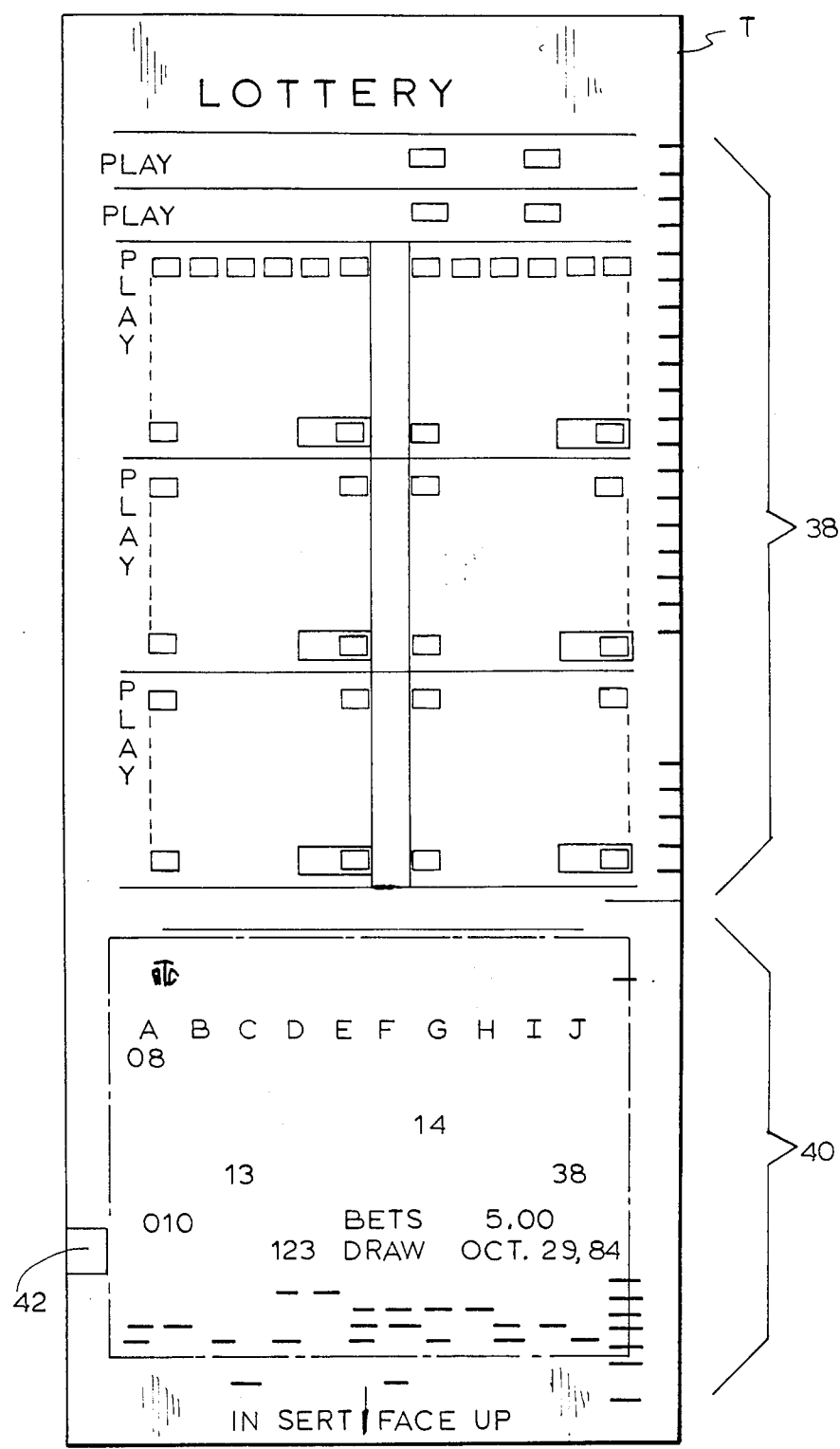
FIG. 5 is an illustration of a typical customer markable ticket usable in conjunction with the ticket processor of the present invention.

FIG. 5 illustrates a typical ticket which can be utilized in conjunction with the processor of the present invention. The ticket T illustrated in FIG. 5 is designed for use in a lottery in which the customer will select six numbers and mark same in the appropriate boxes in each of six areas which form the upper machine-readable portion 38 of the ticket. The lower portion 40 of the ticket is designed to be imprinted with the transactional data in either customer-readable and/or machine-readable form such that the ticket, once imprinted by the processor of the present invention, forms a receipt for the customer. Situated adjacent to portion 40 is a pre-printed black area 42 which, as explained below, is utilized by the processor to coordinate the actuation of the printer with the position of the ticket as it moves along the transport path.

Figure 6:
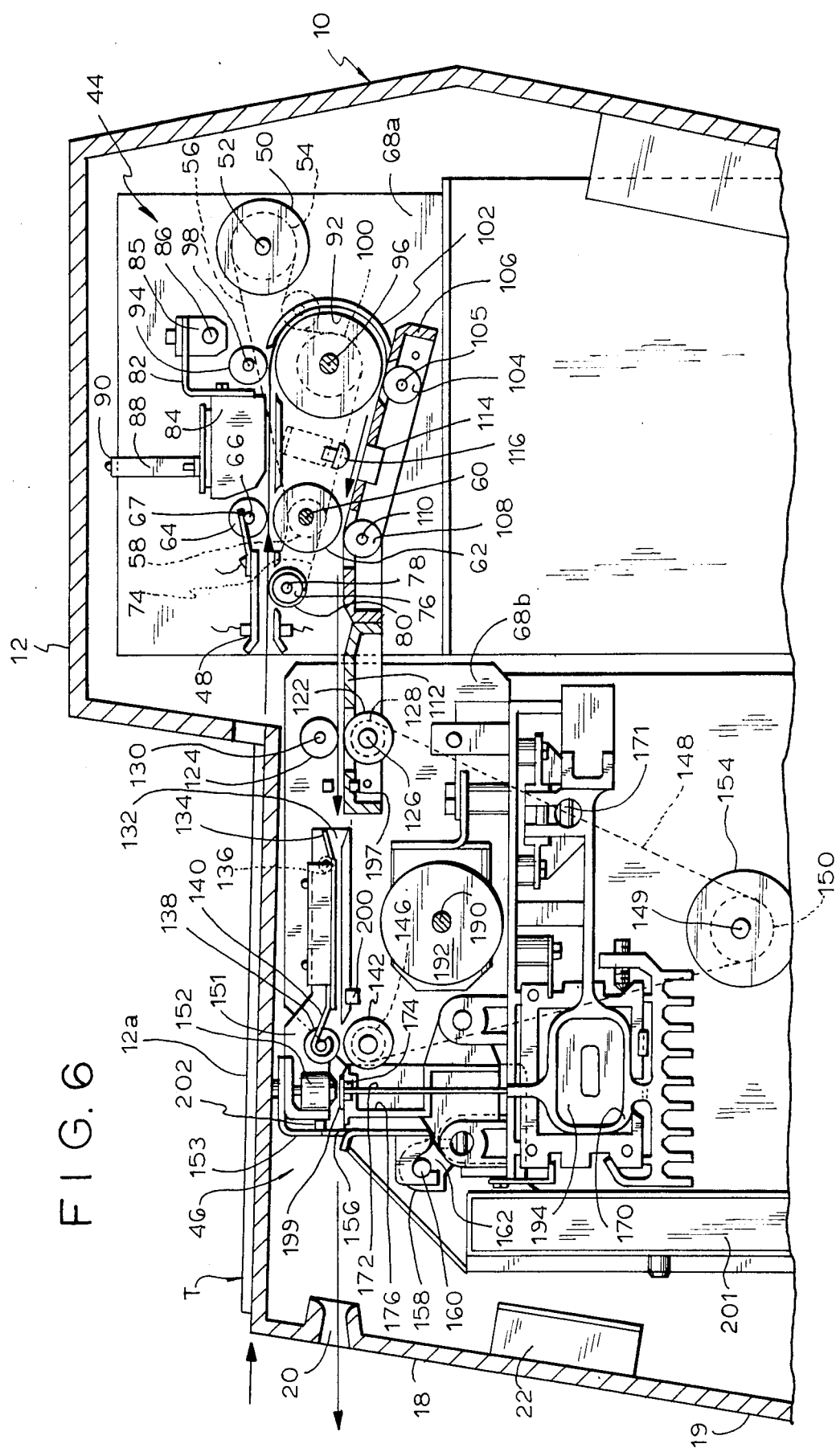
FIG. 6 is a side cross-sectional view illustrating the internal mechanism of the horizontal or vertially orientable compact ticket processor of the present invention.
Figure 7:
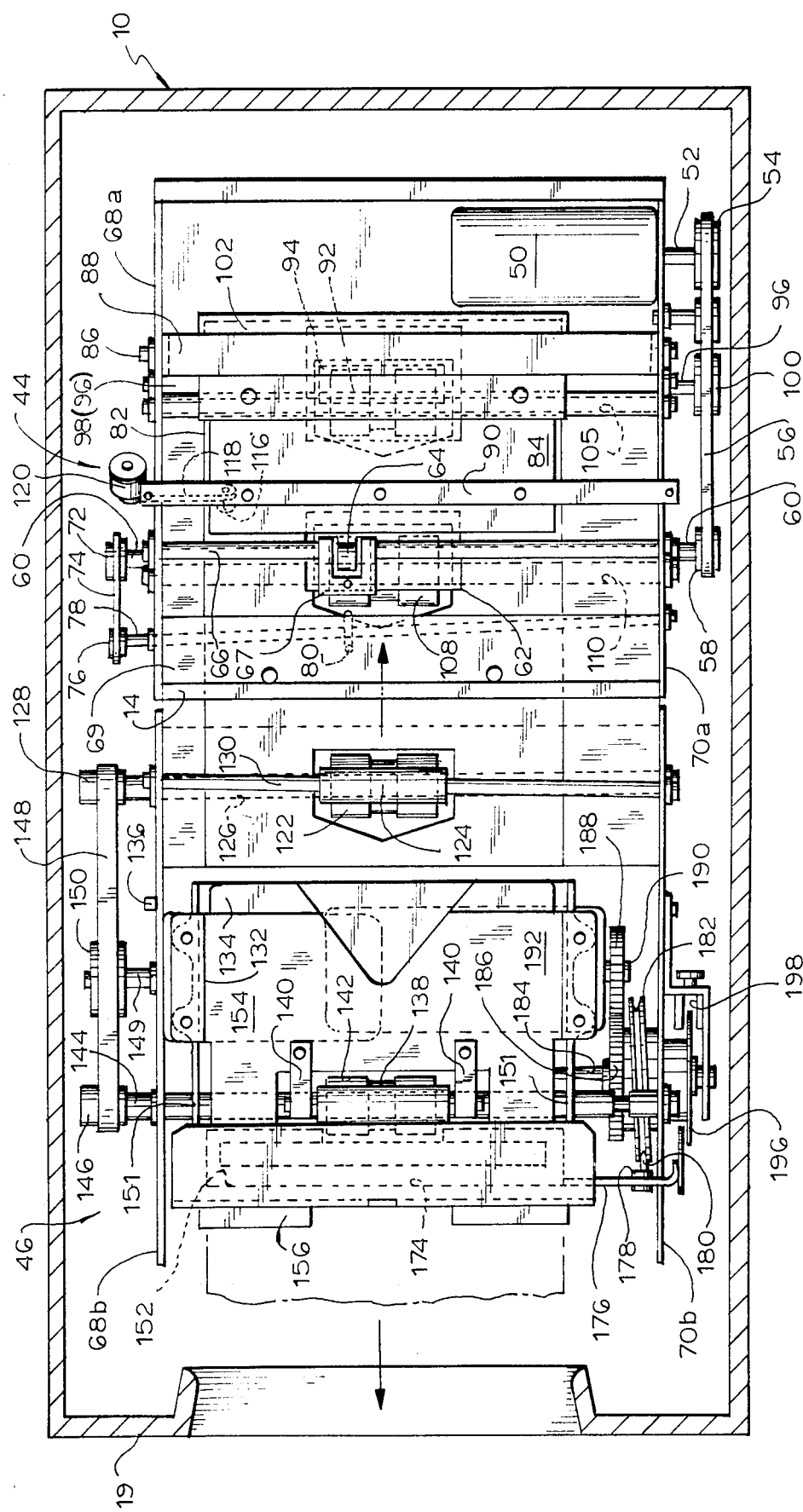
FIG. 7 is a top view of the internal mechanism of the horizontally or vertically orientable compact ticket processor of the present invention.

As seen in FIGS. 6 and 7, the processor of the present invention comprises a reader section, generally designated 44, and a printer section, generally designated 46. Vertical frame sections 68, 70, separated into reader sections 68a and 70a and printer sections 68b and 70b, carry all of the reader and printer components therebetween. A ticket T (face up) enters input slot 14 which is aligned with the lower level 12a of input surface 12 and passes through a photo-electric sensor 48 of conventional design which senses the presence thereof and energizes reader motor 50. Reader motor 50 is connected to an output shaft 52, the end of which extends beyond reader frame section 70a. Shaft 52 carries a pulley 54. Pulley 54 is connected by means of a belt 56 to a pulley 58 mounted on a shaft 60 which carries a drive roller 62. Roller 62 is aligned with a pressure roller 64, rotatably mounted on a shaft 66. Shaft 66 is rotatably mounted on a bifuricated spring element 67 extending from a horizontal part 69.

Shaft 60 passes from the exterior of frame section 70a to a point beyond the exterior frame section 68a and has a pulley 72 mounted thereon. Pulley 72 is connected by means of a belt 74 to a second pulley 76 mounted on the end of a shaft 78 which carries a roller 80. Roller 80 is aligned with part 69. As can best be seen in FIG. 7, shaft 78 is skewed with respect to frames 68 and 70 such that the side edge of incoming ticket T is caused to move towards frame section 68a. This aligns the ticket with edge 82 of the transport path, thereby appropriately aligning the ticket with a fiber optic read head 84, as it passes between rollers 62 and 64.

Figure 8:
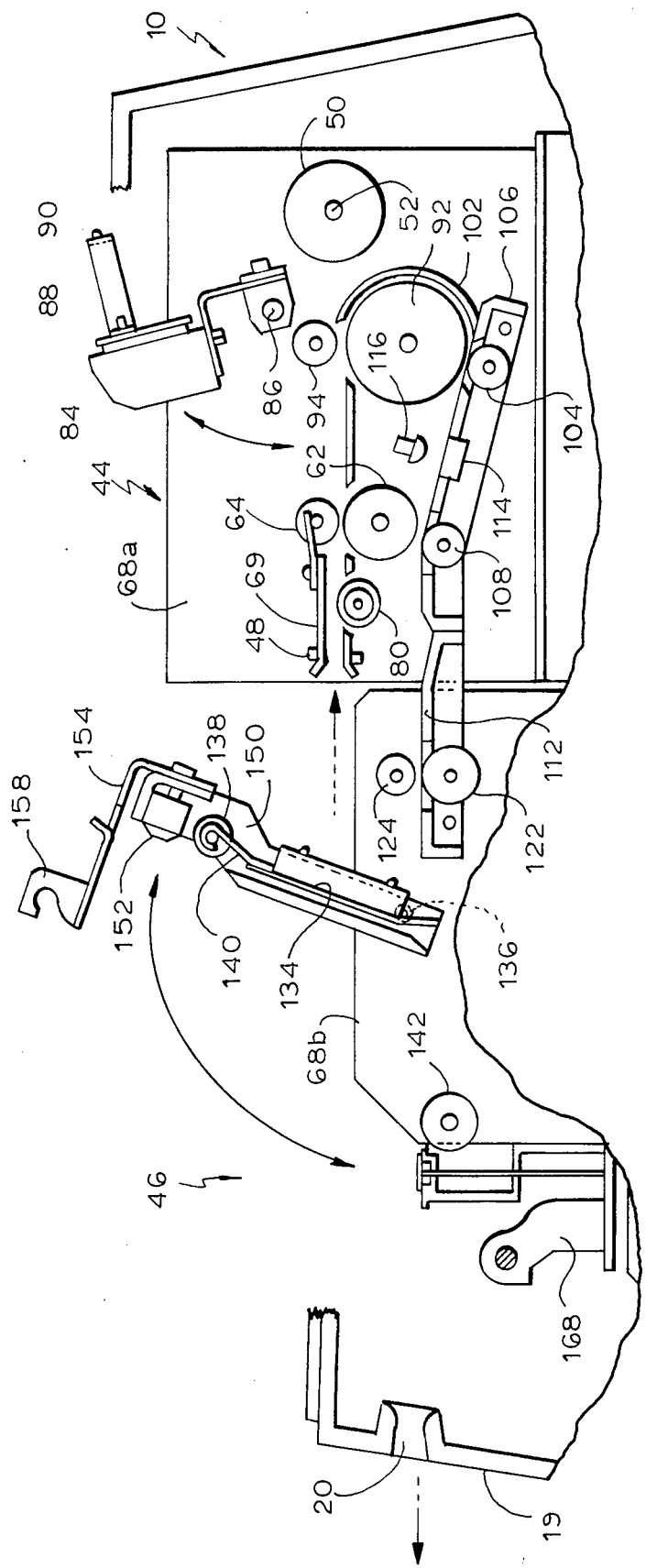
FIG. 8 is a side cross-sectional view of the upper portion of the internal mechanism of the horizontally or vertically orientable compact ticket processor of the present invention showing the reader and printer guide pivoted to permit access to the ticket transport path.

Read head 84, which is of conventional design, is mounted on an "L"-shaped bracket 82. Bracket 82 is mounted between a pair of upstanding side brackets 85, each having a circular opening through which a shaft 86 extends. Shaft 86 is mounted between frame section 68a and 70a such that bracket 82 and read head 84 can pivot about shaft 86, as shown in FIG. 8. This permits the read head and the portion of the transport path aligned therewith to be accessed, when required. Extending upwardly from the top of read head 84 are parts 88 connected to a part 90 which is wider than the distance between frame section 68a and 70a. Part 90 rests on the top edge of the frame sections, to correctly position head 84 with respect to the transport path.

After the ticket passes beneath read head 84, the leading edge thereof enters between a large drive roller 92 and a pressure roller 94. Drive roller 92 is mounted on a shaft 96 and pressure roller 94 is mounted on a shaft 98. Shafts 96 and 98 are vertically aligned. Shaft 96 extends beyond the exterior of frame section 70a and carries a pulley 100 driven by belt 56.

An arcuate guide 102 is situated in spaced relation to the surface of roller 92 forming a channel. The leading edge of the ticket, after it passes between rollers 92 and 94, is guided through this channel in a generally semi-circular path. The leading edge of the ticket then passes between a roller 92 and a pressure roller 104. Roller 104 is rotatably mounted on an inclined guide 106 secured between frame section 68a and 70a. The ticket is guided along the upper planar surface of guide 106 and passes between drive roller 62 and a pressure roller 108 mounted on the shaft 110. The ticket then passes out of reader section 44, into printer section 46, along a second guide 112.

As can be best seen in FIG. 6, the section of guide 106 between rollers 104 and 108 is provided with an anvil element 114. Element 114 is aligned with a displaceable cancellation stamp 116 which, in turn, is connected by an arm 118 to a solenoid 120 mounted externally to frame section 68a. Solenoid 120, when actuated, causes stamp 116 to cancel the ticket.

As the leading edge of the ticket enters the print section 46, it passes between a drive roller 122 and the pressure roller 124. Pressure roller 124 is mounted on a shaft 126 which extends beyond frame section 68b and has mounted thereon a pulley 128. Roller 122 includes an internal overrunning clutch mechanism of conventional design.

As best seen in FIG. 7, pressure roller 124 is mounted on a shaft 130 which is skewed towards frame section 68b such that the edge of the ticket will be forced up against the wall 132 of a guide 134. Thus, the ticket T is properly aligned with the printer mechanism. Guide 134 is rotatably mounted on a shaft 136 so that it can be pivoted to expose the print mechanism, as shown in FIG. 8.

At the other end of guide 134 is a pressure roller 138 mounted to the guide by a pair of springs 140. Pressure roller 138 aligns with a drive roller 142 which is mounted on a shaft 144. Shaft 144 extends beyond the exterior of frame section 68b and carries a pulley 146 thereon. Pulley 146 is connected by means of a belt 148 to a pulley 150 which, in turn, is mounted on a shaft 149 which is the output shaft of the printer stepping motor 154. Belt 148 also passes around pulley 128 so as to power drive roller 122, which contains the overrunning clutch mechanism.

The free end of guide 134 has a pair of spaced upstanding parts 151 mounted thereto. Extending between parts 151 is an "L"-shaped bracket 153 to which an anvil 152 is position adjustably mounted. The upstanding portion of bracket 153 has an opening 156 through which the ticket passes after it is printed. The lower portion of bracket 153 carries a pair of spaced upstanding brackets 158 which have generally "U"-shaped openings therein. The openings in brackets 158 rest on a shaft 160, held by upstanding brackets 162 so as to properly situate the guide assembly 134 and anvil 152 with respect to the print mechanism, as seen in FIG. 6.

The print mechanism is a shuttle-type printer similar to the printer described in detail in U.S. Pat. No. 4,534,287 issued to Robert Meloni on Aug. 13, 1985, entitled "Dot Matrix Print Head" and assigned to the assignee hereof. The mechanism generally comprises a plurality of very thin hammers or actuators 170 of the type described in U.S. Pat. No. 4,349,283 issued to Thomas Sapitowicz and Robert Meloni on Sept. 14, 1982, entitled "Hammer For Dot Matrix Printer" and assigned to the assignee hereof. Actuators 170 are situated in side-by-side relation between a pair of permanent magnets (not shown) in cantilever fashion on a shaft 171, fixedly mounted between frames sections 68a and 70a. Each of the actuators 170 has a print wire 172 mounted therein. The impact ends of the print wires 172 are individually situated in the spaced openings of a wire bearing 174. Wire bearing 174 is, in turn, mounted on a shuttle member 176 designed to move back and forth in a direction generally perpendicular to the direction of movement of ticket T.

As best seen in FIG. 7, shuttle member 176 is provided with a part 178 which includes a pair of spaced bearings 180. Bearings 180 define a recess into which the edge of a plate cam or disc 182 extends. Disc 182 is mounted on a shaft 184. Shaft 184 also carries a gear 186 which meshingly engages a second gear 188 fixedly mounted on the output shaft 190 of the shuttle motor 192.

As shuttle motor 192 rotates shaft 190, and thus gears 188 and 186, disc 182 is rotated. Disc 182 is mounted at an incline or skew with respect to the axis of shaft 184. The rotation of disc 182 will cause part 178 to move back and forth a short distance in a direction generally transverse to ticket movement. This movement of part 178 will cause the shuttle member 176 and wire bearing 174 to likewise move, carrying the impact ends of the impact wires 172 in a back and forth motion.

Each of the actuators 170 carries a flat coil 194 which, when energized, will cause the actuator, and thus the print wire attached thereto, to be displaced towards anvil 152. By appropriately synchronizing the energization of the various coils 194 with the position of the shuttle member, dots are imprinted on the ticket T in the appropriate areas so as to form consumer-readable or machine-readable indicia. As seen in FIG. 7, the end of shaft 184 carries a strobe disc 196 which cooperates with a photoelectric sensor 198 to permit the synchronization of the energization of the actuators with the position of the wire bearing. A ribbon 199 is situated between anvil 152 and bearing 174. Ribbon 199 is an endless loop which extends between two extensions (not shown) of ribbon cassette 201.

Reader motor 50 moves the ticket past read head 84 at a relatively high speed, for example, 30 inches/second for reading of the customer marked data on area 38 of ticket T. As the leading edge of the ticket exits the reader section 44, the printer motor 154 is in the de-energized state. This being the case, the leading edge of the ticket normally would not be able to pass between drive roller 122 and pressure roller 124 because drive roller 122 is connected to the output shaft of motor 154.

However, as mentioned above, drive roller 122 includes an internal overrunning clutch, thereby permitting it to rotate even when motor 154 is de-energized. Accordingly, the ticket can move between rollers 122 and 124. Thus, the leading edge of the ticket can pass between rollers 122 and 124 and into guide 134, as it is driven out of reader section 44 by roller 60 connected to reader motor 50.

Immediately before the leading edge of the ticket T reaches drive roller 142, area 42 on ticket T aligns with a photoelectric sensor 200, situated below guide 134. When this occurs, stepping motor 154 is energized to drive rollers 122 and 142 to move the ticket through the printer mechanism. The ticket is moved through the printer mechanism in a stepwise fashion and, hence, it is moved through the printer at a slower speed. When a leading edge detector 202 reflectively senses mark 42 on ticket T at the correct position, stepping motor 154 is de-energized. At this point, ticket T is properly positioned for the printing of the first row of dots by actuators 170. Stepping motor 154, in synchronization with the shuttle printing mechanism, steps the ticket through the completion of the printing process, through output slot 20 and to the operator.

It should now be appreciated that the transport drive mechanism, including the overrunning clutch associated with drive roller 122, compensates for the transport speed differential between the reader transport and the lower speed printer transport. Accordingly, the ticket does not have to exit the reader section 44 of the mechanism before it is accepted into the printer section 46. This results in a substantial reduction in the length of the transport path, thereby greatly enhancing the compactness of the ticket processor.

The compactness is further enhances by the generally "U"-shaped transport path, including the arcuate channel which joins the read section of the transport path and the print section of the transport path. This is illustrated in schematic form in FIG. 9.

FIG. 10 also illustrates the various drive components and the transport path including the print ribbon 199 which is difficult to see in the other drawings. In particular, FIG. 10 illustrates the relative simplicity of the device, including the two drive motors 50 and 154 and the various drive and pressure rollers which make up the "U"-shaped transport path.

It will now be appreciated that the present invention is a ticket processor including a reader and a printer which is highly compact due to the "U"-shaped transport path and the overrunning clutch mechanism which permits the reader section and the printer section to operate at different speeds without requiring that the ticket exit the higher speed reader section prior to entrance into the lower speed printer section.

While only a single preferred embodiment of the present invention has been disclosed herein for purposes of illustration, it is obvious that many variations and modifications could be made thereto. It is intended to cover all of these variations and modifications which fall within the scope of the present invention as defined by the following claims.

I claim:

1. A ticket processing device for processing customer markable tickets, adapted for use with a substantially planar partition, comprising a housing adjacent the partition, a ticket input slot, ticket reading means, ticket printing means, a ticket output slot, the partition being situated with said input slot on one side thereof and said output slot on the other side thereof, and means for transporting a ticket through a substantially "U" shaped transport path, said path comprising three sections, said first section extending from said input slot through said reading means, said third section extending through said printing means to said output slot, said second section connecting said first and third sections, said first and third sections being relatively closely situated in substantially parallel planes, said second section comprising a substantially arcuate channel having a diameter which exceeds the distance between said parallel planes.

2. The device of claim 1, said partition being situated in a plane substantially parallel to and between said parallel planes.

3. The device of claim 1, wherein said partition is substantially vertical.

4. The device of claim 2, wherein all of said planes are substantially vertical.

5. A ticket processing device for processing customer markable tickets adapted for use with a substantially planar partition, comprising ticket reading means operable at a first speed, ticket printing means operable at a second, relatively slower speed, means for transporting a ticket from said reading means to said printing means, said transporting means comprising means for accepting ticket from said reading means at said first speed and for driving the ticket through said printing means at said second speed, said printing means comprising shuttle and a drive motor for driving said shuttle, said transporting means comprising a stepping motor a drive roller and a pressure roller, said drive roller comprising overrunning clutch means, means for operably mechanically connecting said stepping motor and said drive roller, a ticket input slot, a ticket output slot, the partition being situated with said input slot on one side thereof and said output slot on the other side thereof, and a transport path comprising a first section from said input slot through reading means, a third section through said printing means to said output slot, and a second section connecting said first and third sections, said first and third sections being relatively closely situated and substantially parallel planes.

6. The device of claim 5, further comprising ticket sensing means and means for actuating said printing means when said sensing means senses the leading edge of a ticket.

7. The device of claim 5, wherein said second section comprises an arcuate path.

8. The device of claim 7, wherein said arcuate path comprises a substantially semi-circular channel having a diameter which exceeds the distance between said parallel planes.

9. The device of claim 5, said partition being situated in a plane substantially parallel to and between said parallel planes.

10. The device of claim 5, wherein said partition is substantially vertical.

* * * * *